Sept. 8, 1964
S. M. YATES
PARKING METER
3,147,584
Filed Dec. 7, 1959
2 Sheets-Sheet 1
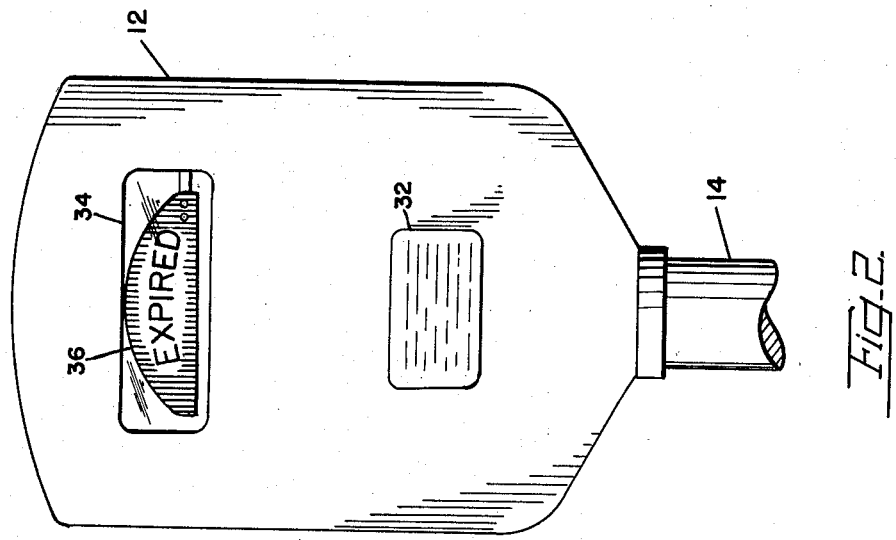
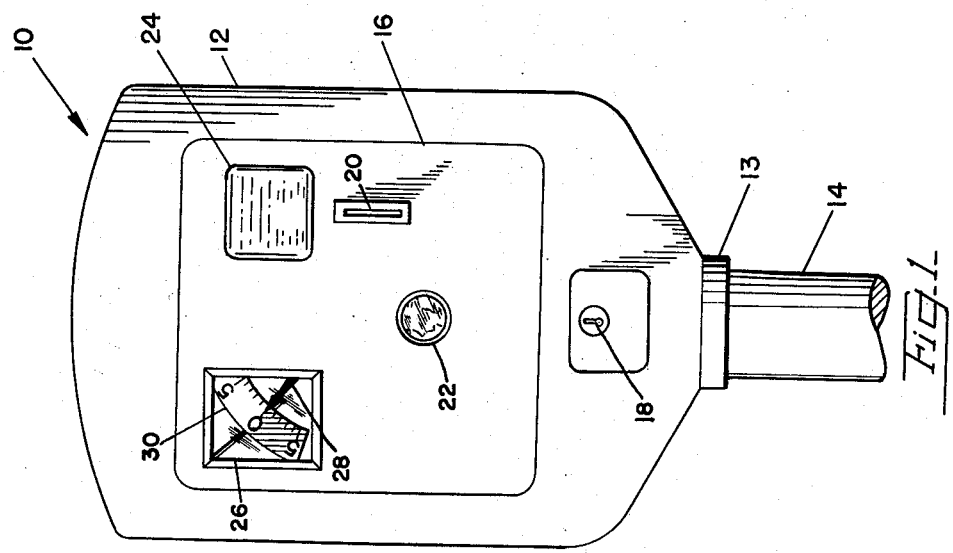
INVENTOR
SAM M. YATES Sept. 8, 1964
S. M. YATES
3,147,584
PARKING METER
Filed Dec. 7, 1959
2 Sheets-Sheet 2
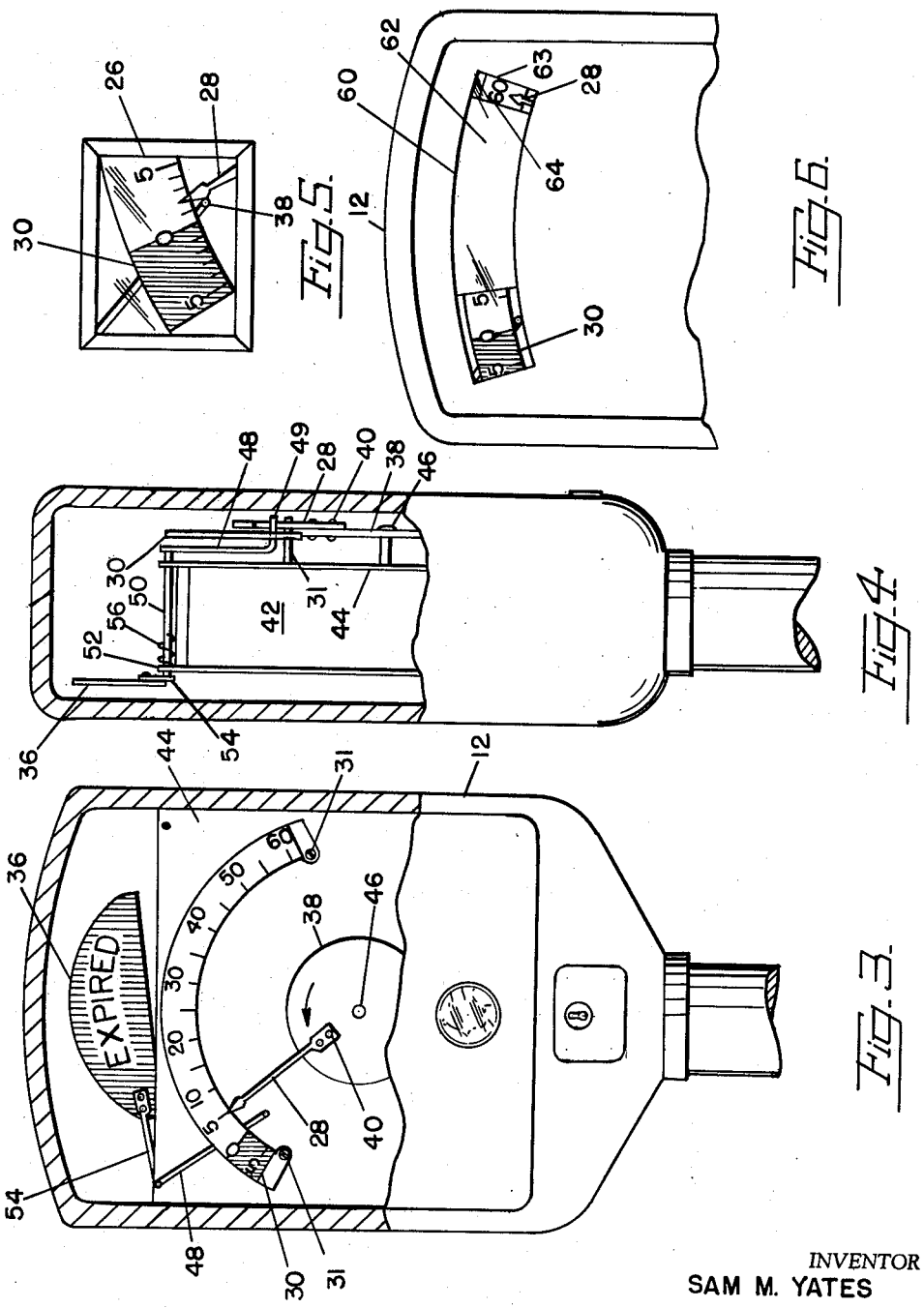
INVENTOR
SAM M. YATES United States Patent Office 3,147,584
Patented Sept. 8, 1964

3,147,584
PARKING METER
Sam M. Yates, 1446 Park Road NW.,
Washington, D.C.
Filed Dec. 7, 1959, Ser. No. 857,824
8 Claims. (Cl. 58—141)

This invention relates generally to clock operated parking meters and more specifically to a means for displaying only a fractional portion of the unexpired time remaining on the meter.

The operation of parking meters in use today follow the general principle of displaying the total unexpired time remaining on the meter. These meters generally have a time dial with indicia thereon and associated clock mechanisms for driving a pointer to indicate the amount of time remaining during the legal parking period. A viewing glass is provided so that anyone glancing at the meter is able to tell the exact amount of time which remains during the legal parking period. Thus, if fifty-five minutes remains on the meter, a person parking in that particular space knows that he does not have to deposit any money in the meter. This has caused two definite problems. First, it obviously reduces the amount of revenue which the city government may expect to obtain from the use of the meters. Secondly, people instinctively look for meters which still have unexpired time remaining thereon and, thus, slow up other traffic which causes congestion and confusion. The avoidance of these problems has been attempted by the use of some very complicated mechanisms which cancel the remaining unexpired time when the car leaves the space, such as, treadles embedded in the street which are connected to the meters, and extensions from the meter posts which are tripped by a car moving out of the particular space. The former method is obviously very expensive because of the necessity of embedding the equipment in the paved street plus the need of a great deal of additional equipment. The latter method is objectionable to motorists in that they do not wish to have the rods or extensions bumping and scraping their automobiles.

Accordingly an object of this invention is to provide a meter which will accrue the maximum amount of revenue available from the parking facilities.

A further object of this invention is to prevent observation of the unexpired time remaining on the meter without the use of devices external to the meter casing.

A still further object of this invention is to provide a casing for a standard meter which will indicate only a small fraction of the unexpired time remaining on the meter.

Another object of this invention is to provide a means whereby any of the standard meters may be adapted to show only a small fraction of the time remaining on the meter with only slight modifications thereof.

The invention, accordingly, consists in the combination of elements, features of construction, and arrangement of parts as disclosed herein together with an illustrative embodiment as shown in the drawings.

In the accompanying drawings

FIGS. 1 and 2 are elevation views representing opposite exterior sides of a parking meter;

FIG. 3 is an elevation view of the front side of the parking meter with a wall of the casing partially broken away to illustrate the elements within the meter;

FIG. 4 is side elevation of the parking meter with a wall of the casing broken away, partially in section, of the view of FIG. 3;

FIG. 5 is a view of the window in the front of the meter; and

FIG. 6 is an elevational view of a modification of the indicating mechanism of the present invention.

Generally speaking, the invention comprises a parking meter having a time indicia scale with a pointer which indicates the amount of unexpired time remaining on the meter. The viewing window shows only a fractional part of the scale, such as the last five minutes remaining on the dial, so that a person viewing the meter would only know the amount of unexpired time remaining on the meter if that amount is five minutes or less. Of course, the person who originally inserted the coin will know the amount of the remaining time since he will be aware of the hour at which he inserted the coin. Thus, if the indicator is not within view, a person wishing to remain more than five minutes in the parking space will be forced to insert another coin in order to be assured of avoiding overtime parking.

Referring now more particularly to the drawings, FIG. 1 shows a front elevational view of a parking meter 10 which is mounted on a post 14 by means of a threaded member 13. In order to have access to the mechanism contained within the meter 10, a removable plate 16 is locked in place in the front of the meter casing. A key slot 18 is provided in the lower part of the casing for unlocking the removable plate 16. Also provided in the removable plate 16 are the standard coin slot 20 and coin viewer window 22 together with a plate 24 for any desired instructions or other indicia. Instead of the standard viewing window which extends the full length of the indicia dial, a small window 26 is provided in plate 16, the window 26 showing only a fractional portion of the time dial 30. In the showing of FIG. 1 the pointer 28 is shown as indicating that the unexpired time remaining on the meter has elapsed.

FIG. 2 is a showing of the opposite side of the meter and has thereon an instruction plate 32 which may be used for any desired indicia. This side of the meter has a window which extends over a substantial portion of the width of the meter in order to present a distinct showing of an expiration flag 36 which is exposed at the end of the legal parking time in a manner which will be later described.

FIGS. 3 and 4 show front and side elevational views, partly in section, of the indicating mechanism of the present invention. The clock work, driving mechanism and the coin actuating mechanism form no part of this invention are not shown for purposes of clarity. These mechanisms may be any of those well known in the art, one example being shown in U.S. Patent No. 2,307,999 for a time measuring instrument. Vertical plates 44 and 52 are mounted on enclosure 42 within which the clock work and the driving mechanism are contained. The indicator 28 is secured to circular plate 38 by means of connections, such as screws 40. In order to provide rotation for plate 38 a shaft 46 is secured to plate 38 and extends through vertical plate 44 and container 42 and is driven by the clock and driving mechanism.

When a coin is inserted in the meter, the indicator is biased to the extreme clockwise position, abutting against screw 31 which secured indicia plate 30 to vertical plate 44. The driving mechanism begins to rotate plate 38 in a counterclockwise direction, thus starting the indication of unexpired time remaining on the meter. Shortly before the indicator reaches the expired zone on the indicia dial, it will contact an L-shaped lever arm 48 which is secured to a shaft 50. Shaft 50 extends through and is rotatably supported by vertical plates 44 and 52 which extend above compartment 42. The other end of shaft 50 is secured to arm 54 to which is secured expiration flag 36. In order to maintain the flag 36 in an upward position which is not viewable through window 34, a spring member 56 is attached to shaft 50 and plate 52 and biases the shaft in a direction which forces flag 36 upwardly. As arm 28 moves in a counterclockwise direction, it contacts portion 49 of the L-shaped arm and overcomes the bias of spring 56, thus rotating shaft 50 which moves flag 36 downwardly into a position in front of window 34. Flag 36 may be made of light metal or plastic in order that a low tension spring may be used so that it will not interfere with or cause damage to the clock mechanism in overcoming the spring bias.

FIG. 5 shows an enlarged view through the window 30 with the indicator 28 and element 38 in contact. As indicated, an expired period may be shown in red to provide an indication of the overtime period. It is to be noted that the window 34 (FIG. 2) through which the expired flag is viewed is large enough to accommodate the small additional movement of flag 36 which is caused by this additional expired period. If desired, the window 30 may be of a configuration which provides a slight magnification in order to present an enlarged view of the portion of the dial exposed.

FIG. 6 shows a method whereby a window, which is presently being used in many meters, may be modified in accordance with the present invention. Such a meter has an arc portion 60 with a window therein to indicate the full time scale. A portion of this window 60 may be covered as shown at 62 in any desired manner. A plate may be secured within the casing covering a portion of the window inside of the meter or the window may simply be painted to conceal the portion which is desired to be covered.

It may be desirable to make some provision which would allow the person depositing the coin to make certain that the meter is working properly. FIG. 6 shows one means of accomplishing this purpose. An additional portion 63 of the window is not covered so as to allow observance of a small increment 64 of the scale at the upper end thereof. This viewing portion need only be large enough to show the indicator 28 at the time the coin is deposited in the meter as shown in FIG. 6. The same result could be provided in the type of meter casing shown in FIGS. 1-4 by means of a small additional window showing a small portion of the upper end of dial 30.

Another means for accomplishing this end, would be to provide cover 62 in the form of a movable plate which is pivoted within the meter and is maintained in a raised position by indicator 38 for the first minute or two after insertion of a coin and then dropped into the position shown in FIG. 6. This, of course, would allow the person inserting the coin to be assured that he is getting his full allotted time when parking.

The embodiment illustrated and described herein is by way of example only, and the scope of the present invention is not limited to the exact details of construction. The particular shape of the meter and the window and the type of mechanism used may be varied according to particular requirements as will be obvious to those skilled in the art. Accordingly, all matter described herein is to be interpreted as illustrative and not as a limitation.

I claim:
1. In a parking meter including an outer casing, a substantially stationary dial having time indicia thereon, an indicator movable over the face of said dial, means for moving said indicator, said dial, indicator and moving means being located within said casing, and a window in said casing for continuously exposing only a fractional part of said stationary dial.

2. A parking meter comprising an outer casing, a substantially stationary dial within said casing, said dial having a time indicia thereon, an indicator movable across the face of said dial, timing mechanism for driving said indicator, and a window in one side of said casing for viewing only a portion of said dial.

3. The apparatus of claim 2 further comprising a window in the other side of casing and an expiration flag visible in said window and actuated by said indicator.

4. A meter comprising an outer casing, a substantially stationary dial having time indicia thereon, a pointer associated with said dial, clock mechanism for driving said pointer, means for initiating operation of said clock mechanism, and transparent means in said casing for continuously viewing only a fractional portion of said stationary dial from the exterior of said casing.

5. The apparatus of claim 4 further comprising a movable expiration flag, means for actuating said flag by said pointer and a window in said casing for viewing said expiration flag from the exterior of said casing.

6. In a parking meter including a substantially stationary dial and movable pointer associated with said dial, an outer casing, and an opening in said casing for continuously viewing only a fractional portion of said stationary dial from the exterior of said casing.

7. In a parking meter including a substantially stationary time dial and a movable pointer, an expiration flag and clock mechanism for driving said pointer, an outer casing including transparent means in said casing for exposing only a fractional portion of said stationary time dial, and a window in said casing for viewing said expiration flag.

8. A parking meter comprising an outer casing, a substantially stationary time dial with indicia thereon mounted within said casing, a pointer mounted within said casing so as to be movable across the face of said dial, a clock mechanism for actuating said pointer and a window in said outer casing for exposing a minor portion of said stationary dial.

References Cited in the file of this patent
UNITED STATES PATENTS

| | | |
|---|---|---|
| 1,830,277 | Jensen | Nov. 3, 1931 |
| 2,096,155 | Breeden | Oct. 19, 1937 |
| 2,198,422 | Woodruff et al. | Apr. 23, 1940 |
| 2,202,581 | Hammer | May 28, 1940 |
| 2,416,213 | Partin | Feb. 18, 1947 |
| 2,551,914 | Trier et al. | May 8, 1951 |
| 2,599,881 | Woodruff | June 10, 1952 |